Patented Jan. 15, 1935

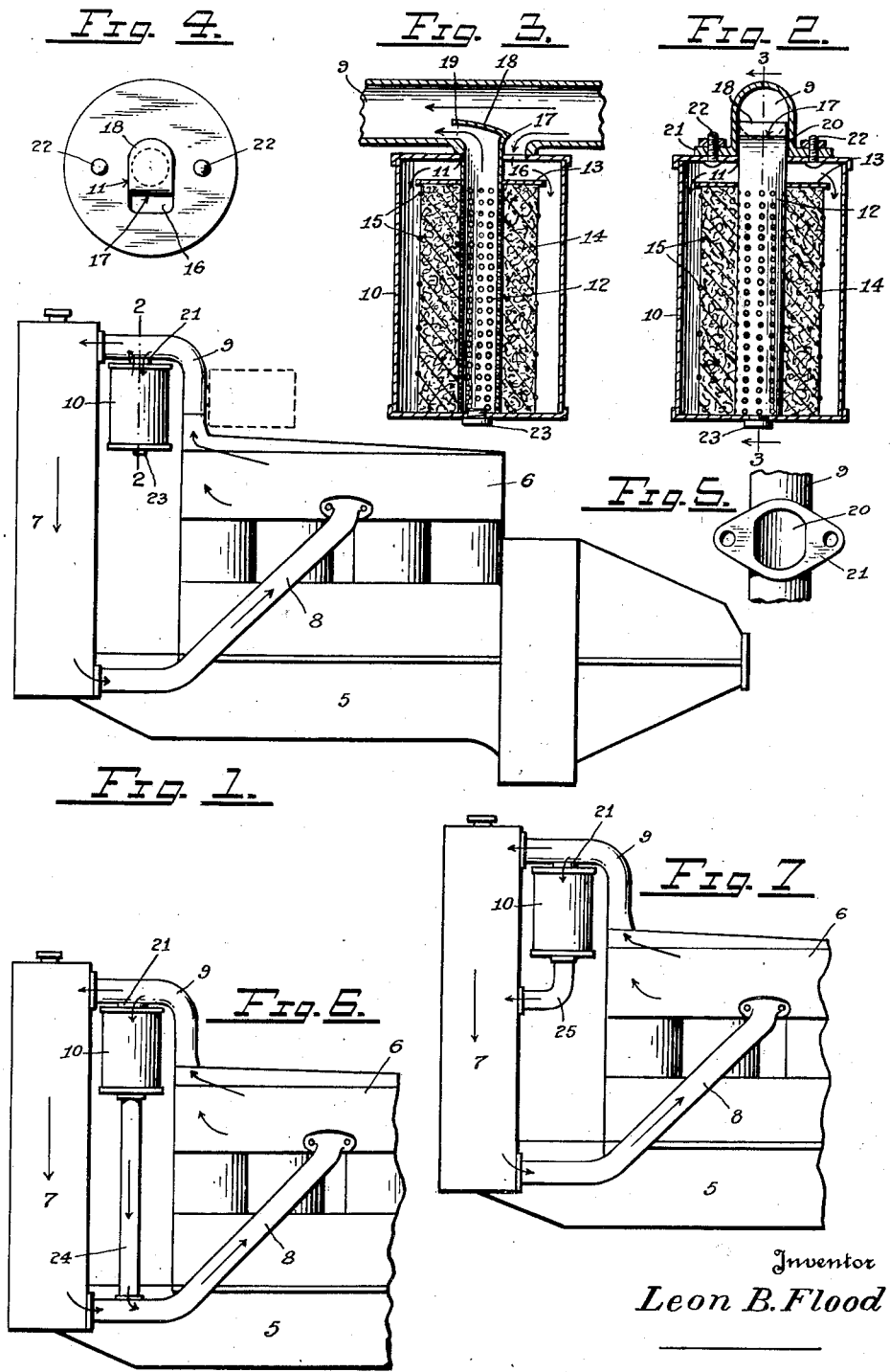

1,987,847

UNITED STATES PATENT OFFICE 1,987,847

FILTER

Leon B. Flood, Bothell, Wash., assignor of one-fourth to Robert C. Moffitt, Seattle, Wash.

Application September 6, 1933, Serial No. 688,347

1 Claim. (Cl. 210—165)

My invention relates to filters and more particularly to the combination of a filter with the circulatory cooling system for internal combustion engines. Certain objects of the invention are to provide a filter, in combination with the circulatory cooling system of internal combustion engines, whereby a portion of the circulating liquid is continually taken from the main circulatory stream, passed through the filter and back into the main stream, and whereby all silt, sediment and other foreign matter is removed from the liquid thus preventing any clogging of the radiator or other parts of the cooling system. While I am aware that several prior attempts have been made to successfully accomplish the desired result, these attempts have been confined to the method of placing a screen or other filtering medium directly in the line of flow of the main stream of the cooling liquid. This interception of the main stream by the filtering element results in impeding its flow and ultimately in clogging the filtering element itself to an extent which seriously interferes with the free circulatory movement of the liquid. My invention is based on an entirely different principle, namely the by-pass method or system and consists in means whereby only a portion of the circulating liquid removed from the main stream, filtered and passed back into the main stream without interfering with the free circulatory movement of the main stream.

With the foregoing and other objects in view which will appear as the description proceeds, the invention consists of the novel construction, adaptation, combination and arrangement of parts hereinafter described and claimed. These objects are accomplished by devices illustrated in the accompanying drawing; wherein: Figure 1 is a view in side elevation showing the filter connected to the upper inlet conduit of an internal combustion engine; Fig. 2 is a view in central vertical section through the filter taken substantially on a broken line 2—2 of Fig. 1; Fig. 3 is a corresponding view taken on a broken line 3—3 of Fig. 2; Fig. 4 is a top plan view of the filter; Fig. 5 is a bottom plan view showing the portion of the upper radiator conduit that is adapted to be connected to the top of the filter; Fig. 6 is a view in side elevation showing the filter connected and installed between the upper and lower radiator conduits; and Fig. 7 is a corresponding view showing the filter connected and interposed between the upper radiator conduit and the radiator itself.

In reducing my invention to practice its basic principle, namely the by-pass method or system is susceptible of various arrangements all of which are equally adaptable to the one method of removing a portion of the circulating liquid from the main circulatory stream, filtering same and passing it back into the main stream. In Figs. 1 to 5 of the drawing I have shown the simplest and most economical means for accomplishing the results of the invention which I will now describe in detail.

Referring particularly to Fig. 1, the numeral 5 designates an internal combustion engine of any type or design, and which comprises the usual engine block 6, radiator 7, lower radiator outlet conduit 8, and upper inlet radiator conduit 9. Said conduits connect the radiator and engine block and thus form the circulatory cooling system of the engine. The cooling liquid may be circulated around the system by a pump, by thermo-siphon means, or by any other circulatory means.

My invention primarily consists of a filter comprising an outer casing 10 having an elongated opening 11 in its top. A tube 12 extends fixedly through said elongated opening into the casing and is centrally fixed to its bottom. Said tube is perforated upwardly from its bottom a greater portion of its length and an annular flange or disc 13 is fixed to the tube immediately above its perforations. A filter core 14, preferably made of compressed animal hair, is secured around the tube, between said disc and the bottom of the casing, by means of a wire binding 15.

One side of the tube 12 extends upwardly through the elongated opening 11 and said tube closes said opening with the exception of a small passage 16 through the top of the casing on the outside of the tube and opposite to its upstanding portion. Said upstanding portion of the tube is curved toward said small passage and is then deflected away in the opposite direction to form a sharp shoulder 17 and a lip or shield portion 18 which bridges the top opening of the tube and leaves an outlet 19 therefor as most clearly shown in Fig. 3. The upper conduit 9 is provided with an opening 20, corresponding with the opening 11, and a flange 21 is formed around said opening 20 integral with the conduit. The ends of the flange are provided with holes which receive upstanding studs 22 fixed to the top of the casing 10 and nuts are used to secure the flange and filter together thus retaining the filter in offset relation on the conduit as will be understood When the filter is secured to the conduit 9 the opening 11 in its top coincides with the opening 20 in the conduit and a water tight connection is made with the small passage 16 communicating with the interior of the filter and the lip or shield 18 of the tube 12 projecting into the conduit as clearly shown in Fig. 3. The main stream of the circulating liquid moves in the direction indicated by the long arrow and a portion of same strikes the shoulder 17 and is deflected into the filter through the passage 16. The filter is therefore continually supplied with liquid which passes through the filter core 14 into the perforated tube 12 and through its outlet 19 back into the main circulating stream.

In the foregoing description it will be apparent that the main circulating stream of liquid is not effected and freely continues its movement through the circulatory system, while only a small portion thereof is caused to pass through the filter. The filter core 14, being made of animal hair, is very porous and the tube 12 is amply perforated so that only slight resistance is encountered by the liquid in its passage through the filter. The lip 18 at the top of the tube acts as a shield against the force of the main stream within the conduit 9 and promotes circulation of the liquid through the filter. It will now be obvious that I have provided a by-pass means for filtering the circulating liquid which means is offset from the circulatory system and does not interfere with the passage of liquid therethrough. A drain plug 23 may be installed in the bottom of the filter casing 10 in communication with the bottom of the tube 12 for the purpose of draining out the filter.

In Figs. 6 and 7 of the drawing I have shown the filter connected to the upper conduit 9 as in the foregoing description, and in Fig. 6 a pipe 24 forms a connection between the bottom of the filter and the lower conduit 8; while in Fig. 7 a pipe 25 connects the bottom of the filter directly with the radiator 7. In both of these latter cases the lip or shield 18 may be fastened down and thus serve as a closure for the outlet 19. Otherwise the action of the filter is the same and adheres to the by-pass principle in removing a portion of the circulating liquid from the main stream and returning it thereto after it is filtered. The filter may be connected to various other points of the circulatory system, as for instance the engine block 6, and in fact the invention contemplates connecting the filter directly to or across any portion of the circulatory system as long as the method of removing a portion of the liquid from the system at one point and restoring it to the system at another point after it has passed through the offset filter is adhered to.

In the action of the filter, assuming that one-tenth of the volume of liquid within the circulatory system passes through the filter at each circuit, ten complete circuits of the liquid will, of course, be necessary in order for all the liquid to pass through the filter. When the liquid has completely passed through the filter all foreign matter will have been removed therefrom and deposited in the filter. It is an object of the invention to provide a filter that is very inexpensive in construction and which is readily detachable from the cooling system so that when same becomes sufficiently filled with sediment it may be discarded and replaced by a new filter.

Having thus described my invention, it being understood that the device herein shown and described is intended as an illustration of one means whereby the principles of the invention may be reduced to practice, and that such changes in its construction and arrangement may be resorted to as do not involve a departure from the scope and spirit of the invention, what I claim and desire to secure by Letters Patent of the United States is:—

In a combined circulatory cooling system for internal combustion engines and a filter connected thereto in offset relation, means whereby a portion of liquid circulating within the system is removed therefrom at one point, passed through the filter, and restored to the system at another point, said means comprising a perforated tube extending from communicative relation with the system into the filter, a filter core disposed around the perforated portion of the tube, a lip projecting from the tube into the system, and a passage connecting the filter with the system exteriorly of the tube and adjacent the lip.

LEON B. FLOOD.